Feb. 2, 1943.　　　　F. KRUEGER　　　　2,309,963
APPARATUS FOR MAKING CAN BODIES
Filed March 13, 1940　　　5 Sheets-Sheet 1
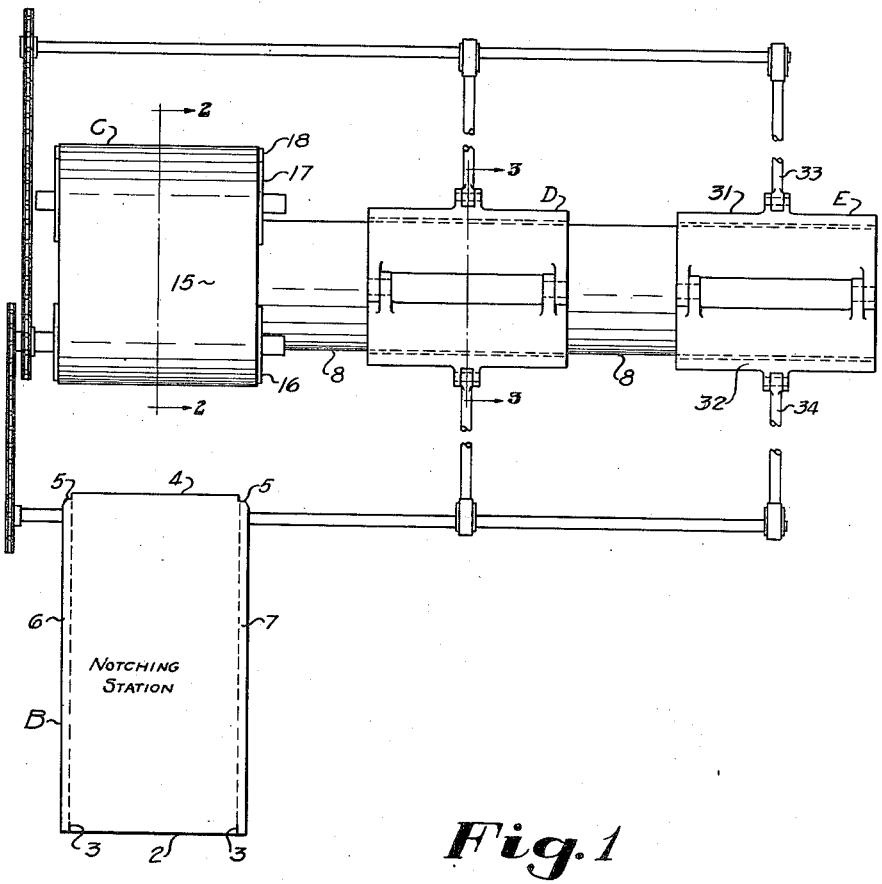
Fig.1
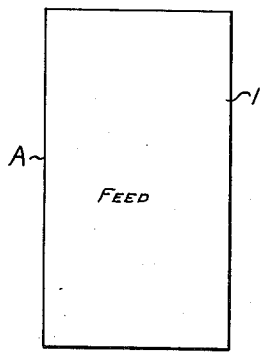
INVENTOR.
FRANK KRUEGER
BY
ATTORNEY Feb. 2, 1943. F. KRUEGER 2,309,963
APPARATUS FOR MAKING CAN BODIES
Filed March 13, 1940 5 Sheets-Sheet 2

INVENTOR.
FRANK KRUEGER
BY
ATTORNEY.

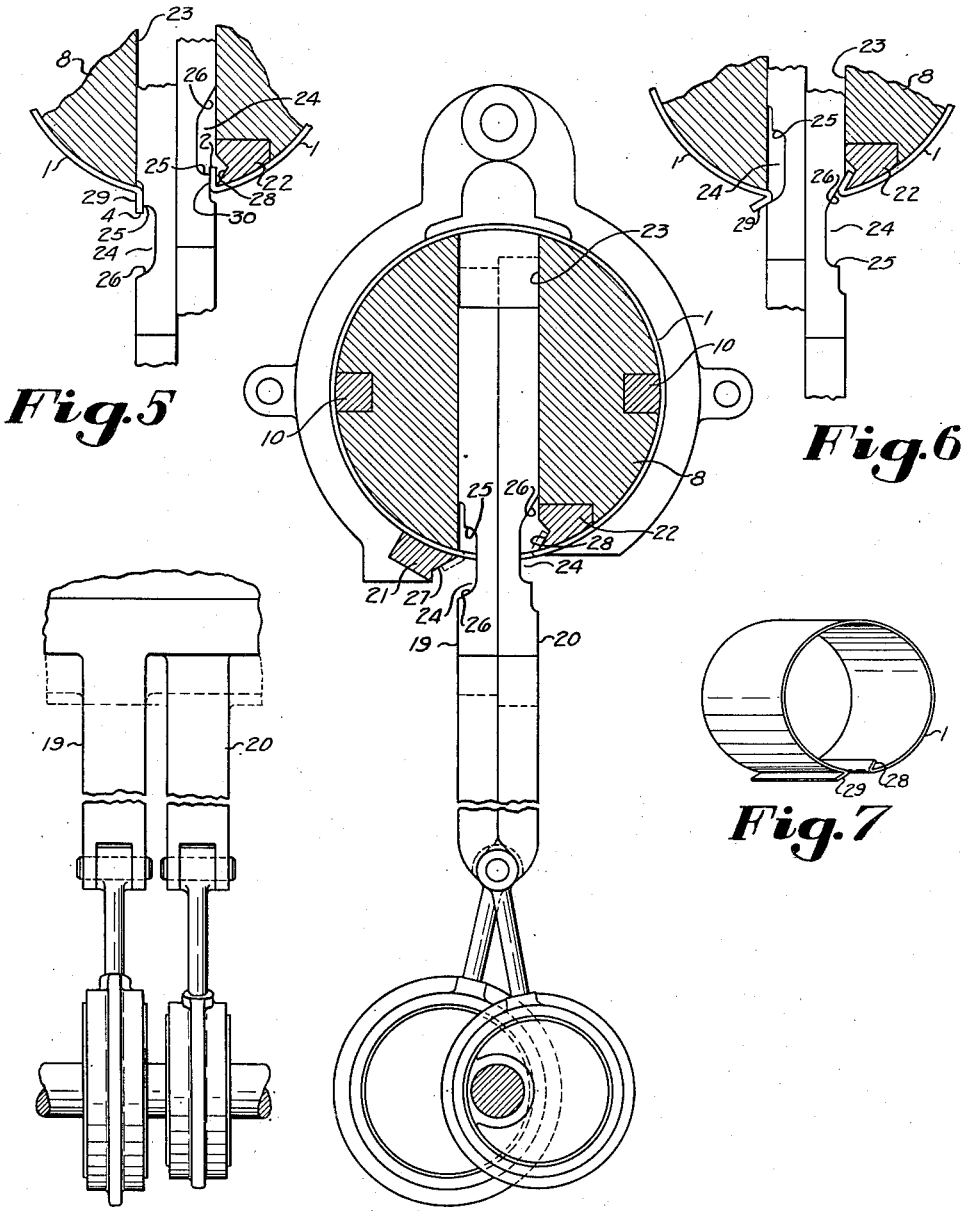

Feb. 2, 1943.  F. KRUEGER  2,309,963
APPARATUS FOR MAKING CAN BODIES
Filed March 13, 1940  5 Sheets-Sheet 4

INVENTOR.
FRANK KRUEGER
BY
Fay, Goleich, Williams & Fay
ATTORNEY.

INVENTOR.
FRANK KRUEGER

Patented Feb. 2, 1943

2,309,963

UNITED STATES PATENT OFFICE 2,309,963

APPARATUS FOR MAKING CAN BODIES

Frank Krueger, Milbrae, Calif., assignor to E. W. Bliss Company, Brooklyn, N. Y., a corporation of Delaware Application March 13, 1940, Serial No. 323,715

6 Claims. (Cl. 153—32)

This invention relates, as indicated, to apparatus for making can bodies, but has reference more particularly to apparatus for making bodies which have side seams formed of interlocked flanges.

It has heretofore been proposed, as in Leavitt Patent No. 382,537, to feed can body blanks between a pair of coacting rollers and against a former which bends the blank downwardly and guides it into the space about a horn, the blank being carried forward until its leading edge strikes against a shoulder formed on the horn.

This method was disadvantageous in a number of respects, first of which was the fact that it required the mounting of the horn in a heavy and cumbersome block, making access to the horn extremely difficult. Another disadvantage was that it resulted in the formation of a seam at the top of the formed blank, so that when solder was subsequently applied to the seam, such solder was likely to run over the can body. A third disadvantage was the lack of speed, and production capacity.

Although in later developments in the can body making art, the blank was so formed as to place the seam at the bottom, thereby obviating the aforesaid disadvantage, the auxiliary devices required for forming the blank were still such that the speed of forming was not sufficient to meet present day demands.

A primary object of the present invention, accordingly, is to provide apparatus for making can bodies, whereby high speeds and maximum production are attained with a minimum amount of equipment.

Another object of the invention is to provide novel apparatus or means for rolling a can body blank.

Other objects and advantages of the invention will be apparent during the course of the following description.

In the accompanying drawings, forming a part of this specification, and in which like numerals are employed to designate like parts throughout the same:

Fig. 1 is a plan view of my improved body maker;

Fig. 3 is a section through Fig. 1 as indicated by the lines 3—3 thereon;

Fig. 4 is a side view of a detail of the mechanism shown in Fig. 3;

Figs. 5 and 6 are details of the mechanism in Fig. 3 showing the position of the parts during the edging operation;

Fig. 7 is a perspective of a can body with the seam edge;

Figure 2:
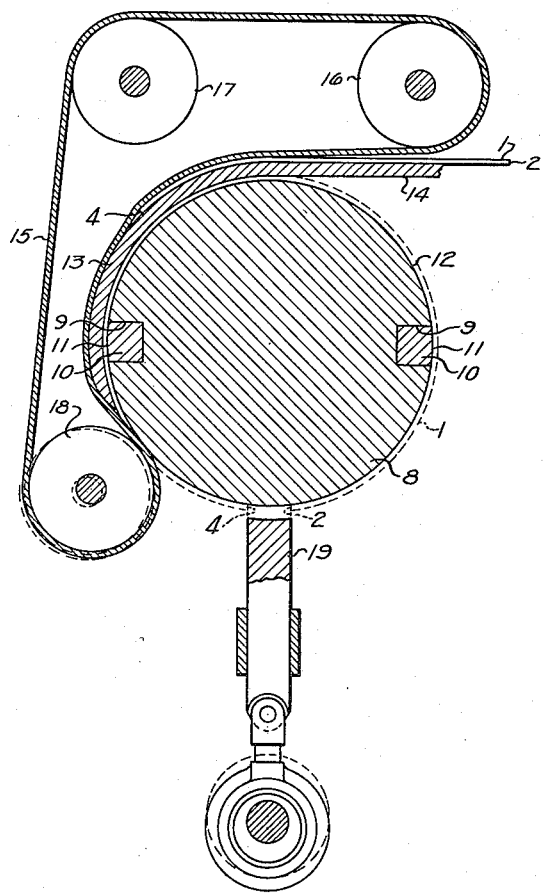
Fig. 2 is a section therethrough as indicated by the lines 2—2 of Fig. 1.

The apparatus, as shown, comprises a feed station A, a notching station B, a rolling station C, and edging station D and a bumping station E.

The can body blank 1 is fed to the notching station B from a pile of such blanks located at the feed station A, as by means of a sheet feeder, not shown, but which may, for example, be a sheet feeding mechanism, such as disclosed in my copending application, Serial No. 264,521, filed March 28, 1939. At the notching station, one of the seam edges 2 of the can is slitted at points spaced somewhat from the ends of such edge, as indicated by reference numeral 3 and corner portions are blanked out at the ends of the other seam edge 4 of the blank, as indicated by reference numeral 5. The resulting blank then includes top and bottom marginal portions 6 and 7, which are utilized in forming the can end flanges to which the ends of the can are adapted to be secured.

The slitted and notched blank 1 then proceeds to the rolling station C, consisting of mechanism which is illustrated more or less diagrammatically in Fig. 2, whereby the can is curved into cylindrical form. This mechanism comprises a magnetic horn 8 having longitudinally extending recesses 9 therein at diametrically opposed points in which feed fingers 10 are mounted for reciprocatory movement. The outer surfaces 11 of these fingers form in effect a continuation of the outer surface 12 of the horn.

In spaced relation to the horn, and curved to conform with the outer surface 12 of the latter, is a stationary bending arbor 13, the upper portion of this arbor being extended to provide a horizontal table portion 14 upon which the blank is adapted to be received.

An endless belt 15 is provided, which extends around sheaves 16, 17 and 18 and whose outer surface is adapted to bear against the arbor 13 for blank-feeding purposes, as will be presently described.

The mechanism further includes a vertically reciprocable blank stop 19.

As the blank 1 is received on the arbor 13, it is fed forwardly by the belt 15 and, at the same time, curved to conform with the arbor. With the blank stop 19 in lowered position, the blank, moving at a high speed, envelops the horn 8, and its motion ceases when the stop is raised into contact with the horn, as indicated by the dotted lines in Fig. 2, and the edge 4 of the blank engages said stop. The blank is of such size that when the movement of the blank is arrested by the stop, the rear edge 2 of the blank lies adjacent the side of the stop which is opposite that engaged by the edge 4. The blank, which has now been rolled to cylindrical form, with its edges 2 and 4 spaced from each other, is now ready for the edging or flanging operation. For this purpose, it is moved by flanges (not shown) on the feed fingers 10 to the edging station D.

At the edging station, the operations shown in Figs 3, 4, 5, 6 and 7 are performed. Mechanism for the edging operations comprises a pair of vertically-reciprocating bars 19 and 20 and formers or edgers 21 and 22. The bars 19 and 20 reciprocate in a slot 23 in the horn 8 and are movable in synchronized relation to each other, so that as one bar is being raised, the other is being lowered. Each of the bars is provided with a recess 24 in its outer side, the upper end of which in one bar and the lower end of which in the other bar terminate in a shoulder or projection 25, the function of which will be presently described. At the opposite end of each recess is a wall 26, the function of which will also be described. The former 21 is provided with a beveled face 27 against which the flange which forms one portion of the can seam is bent, and the former 22 is provided with a beveled face 28 against which the flange which forms the other portion of the can seam is bent.

As the cylindrical can blank reaches a position adjacent the aforesaid bars and formers, the bar 19 is lowered, with the result that the shoulder 25 bends a portion of the blank adjacent the edge 4 outwardly, forming a flange 29. At the same time, the bar 20 is raised, with the result that the shoulder 25 on this bar bends a portion of the blank adjacent the edge 2 inwardly, forming a flange 30. The position of the bars 19 and 20 just prior to the aforesaid flanging operation is shown in Fig. 3, and the position thereof at the conclusion of such operations is shown in Fig. 5.

The bar 19 is then moved upwardly, causing the wall 26 of the recess 24 to bend the flange 29 outwardly and into engagement with the face 27 of the former 21, as indicated in dotted lines in Fig. 3 and in solid lines in Fig. 6. At the same time, the bar 20 is moved downwardly, causing the wall 26 of the recess 24 in this bar to bend the flange 30 outwardly and into engagement with the face 28 of the former 22, as indicated in dotted lines in Fig. 3 and in solid lines in Fig. 6. The appearance of the can body, at the conclusion of the aforesaid operations is shown in Fig. 7.

The feed fingers 10 then move the body along to the bumping station E, at which the various operations shown in Figs. 8, 9, 10, 11 and 11a are performed. At this station, the horn consists of relatively movable parts 8a and 8b, which are initially in the position shown in Fig. 8, that is to say, they are sufficiently close to each other as to leave spaces a and b between the horn parts and the blank 1. Disposed about the horn are semi-cylindrical flange interlocking members 31 and 32 which are pivoted together at their upper ends, as at 33, and are respectively movable about said pivot, and towards and away from the horn by means of levers 33 and 34 actuated in synchronism by suitable mechanism, not shown. The member 31 is provided at its lower end with a flange engaging tool 35, and the member 32 is provided with a similar tool 36.

Figure 8:
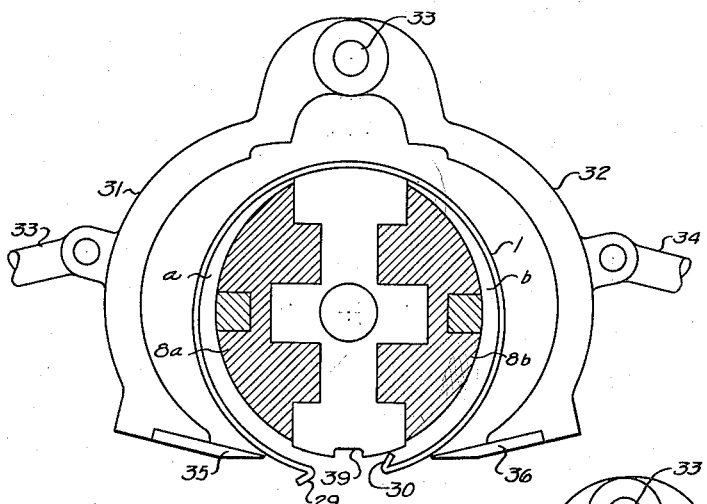
Fig. 8 is a section through the mechanism at the bumping station.
Figure 9:
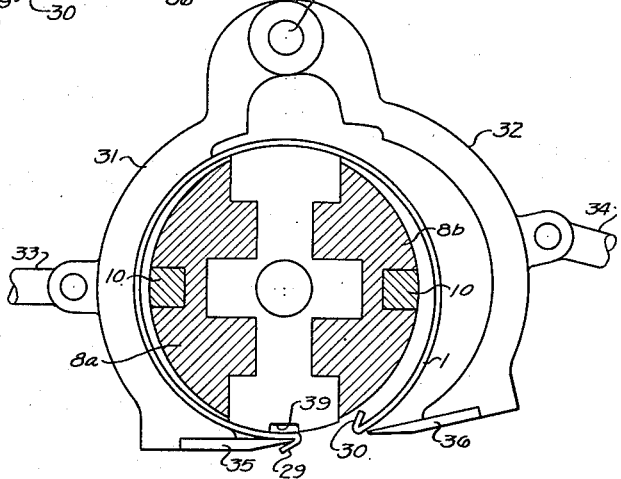
Figs. 9 and 10 show the positions of the respective parts of Fig. 8 during the locking operation.
Figure 10:
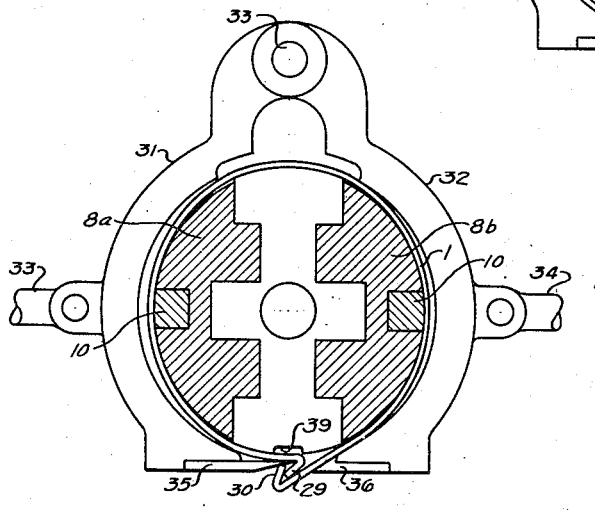

After the blank 1 reaches the position shown in Fig. 8, the member 31 is moved inwardly toward the horn to the position shown in Fig. 9, causing the tool 35 to engage the flange 29 of the can blank and moving the latter to the position shown in this figure. The member 32 is then moved inwardly toward the horn, causing the tool to move the flange 30 of the can blank to the position shown in Fig. 10, in which position it is interengaged with the flange 29.

Figures 11, 11A:
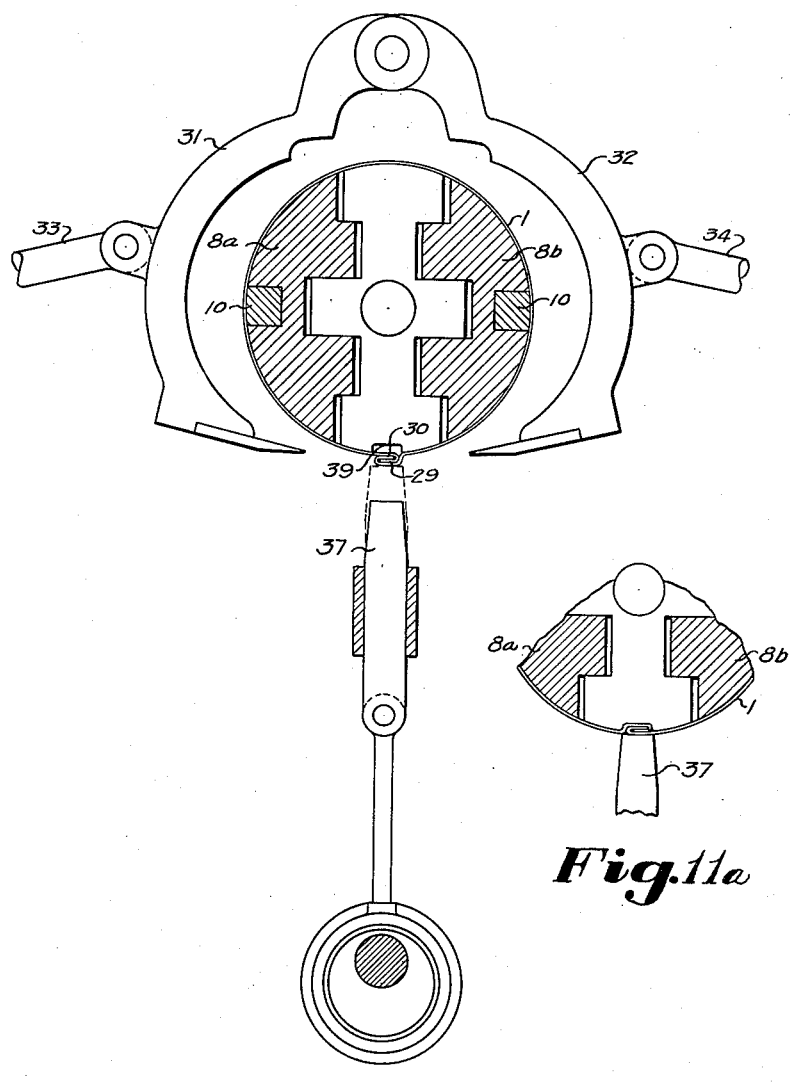
Fig. 11 shows the position of the same parts immediately prior to the bumping operation.
Fig. 11a is a fragmentary view, similar to Fig. 11, but showing the completion of the bumping operation.

The members 31 and 32 are then moved apart as shown in Fig. 11, and at the same time, the horn parts 8a and 8b are moved apart sufficiently to cause a full interlocking of the flanges 29 and 30 of the can blank.

However, the seam projects outwardly beyond the outer peripheral surface of the can body, and is required to be disposed inwardly of such surface.

The final operation which results in the movement of the seam inwardly of the peripheral surface of the can body is accomplished by a vertically reciprocable hammer 37, which, on its upward stroke, bumps the flanged edges of the blank, forming a lock seam of the character illustrated in Fig. 11; and forcing the seam inwardly of the peripheral surface of the can body, as shown in Fig. 11a, the central portion of the horn being relieved as at 39 for accommodating the body seam.

Figure 12:
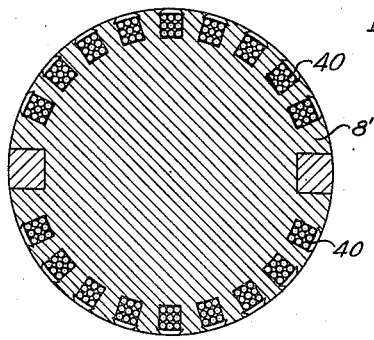
Fig. 12 is a cross-sectional view of a modified form of magnetic horn.

In Fig. 12, a modified form of horn 8' is shown, which may be used instead of the horn 8. In this form of horn, the horn is magnetized by means of coils 40 which are disposed in circumferentially spaced recesses in the periphery of the horn.

It is to be particularly noted that the sequence of operations is such that the rolling of the blank precedes, rather than follows, the edging operation, and that the means for rolling the blank and for causing an interengagement and interlocking of the flanges are, so far as I am aware, entirely novel.

Referring again to Fig. 2, it will be noted that considerable speed is attained by the use of an endless belt to feed the blanks to the horn 8, and that the belt is also utilized to bend the blank as it leaves the lower beveled edge of the arbor so that the blank conforms with the surface of the horn. This dual function of the belt is believed to be entirely novel. It may also be noted that the seam is formed at the bottom, so that in the subsequent seam soldering operations, excess solder will not run over the can body.

It is to be understood that the form of my invention herewith shown and described, is to be taken as a preferred example of the same, and that various changes in the shape, size and arrangement of parts may be resorted to, without departing from the spirit of my invention, or the scope of the subjoined claims.

Having thus described my invention, I claim:
1. In a can body maker, a forming horn, an endless belt mounted for movement transversely of said horn and adjacent thereto, a stationary arbor interposed between said horn and said belt, and partially surrounding said horn and spaced from said horn to permit a can body blank to pass between the arbor and the horn, means to drive said belt to cause the blank to travel along the exterior surface of said arbor to feed the blank over said arbor on to said horn and around said horn under said arbor to form the blank into cylindrical form.

2. In a can body maker, a forming horn, an endless belt mounted for movement transversely of said horn and adjacent thereto, a stationary arbor interposed between said horn and said belt, and partially surrounding said horn and spaced from said horn to permit a can body blank to pass between the arbor and the horn, said arbor presenting an edge over which the blank is drawn, means to drive said belt to cause the blank to travel along the exterior surface of the arbor to feed a blank over said arbor edge on to said horn and around said horn under said arbor to form the blank into cylindrical form.

3. In a can body maker, a forming horn, an endless belt mounted for movement transversely of said horn and adjacent thereto, a stationary arbor interposed between said horn and said belt, and partially surrounding said horn and spaced from said horn to permit a can body blank to pass between the arbor and the horn, said arbor presenting an edge over which the blank is drawn, means to drive said belt to cause the blank to travel along the exterior surface of the arbor to feed a blank over said arbor edge on to said horn and around said horn under said arbor to form the blank into cylindrical form, and radially movable means for stopping movement of said blank.

4. In a can body maker, a forming horn, an endless belt mounted for movement transversely of said horn and adjacent thereto, a stationary arbor interposed between said horn and said belt, and partially surrounding said horn and spaced from said horn to permit a can body blank to pass between the arbor and the horn, said arbor being curved about said horn and extending to a point below the horizontal medial plane of said horn to present an edge over which the blank is drawn, means to drive said belt to cause the blank to travel along the exterior surface of said arbor to feed a blank over said arbor edge on to said horn and around said horn under said arbor to form the blank into cylindrical form.

5. In a can body maker, a forming horn, an endless belt mounted for movement transversely of said horn and adjacent thereto, a stationary arbor interposed between said horn and said belt, and partially surrounding said horn and spaced from said horn a distance approximately equal to the thickness of a can body blank to permit said blank to pass between the arbor and the horn, means to drive said belt to cause the blank to travel along the exterior surface of said arbor to feed a blank over said arbor on to said horn and around said horn under said arbor to form the blank into cylindrical form.

6. In a can body maker, a forming horn, an endless belt mounted for movement transversely of said horn and adjacent thereto, a stationary arbor interposed between said horn and said belt, and partially surrounding said horn and spaced from said horn a distance approximately equal to the thickness of a can body blank to permit said blank to pass between the arbor and the horn, means to drive said belt to cause the blank to travel along the exterior surface of said arbor to feed a blank over said arbor on to said horn and around said horn under said arbor to form the blank into cylindrical form, stop means movable into the path of the leading edge of the blank to engage the same and arrest movement thereof.

FRANK KRUEGER.